United States Patent [19]
Wynn

[11] Patent Number: 4,791,965
[45] Date of Patent: Dec. 20, 1988

[54] CO-EXTRUDED TUBE

[75] Inventor: Gerald E. Wynn, El Cajon, Calif.

[73] Assignee: James Hardie Irrigation, Inc., Laguna Niguel, Calif.

[21] Appl. No.: 14,796

[22] Filed: Feb. 13, 1987

[51] Int. Cl.⁴ .............................................. F16L 9/14
[52] U.S. Cl. .................................... 138/146; 138/137
[58] Field of Search .............. 138/137, 145, 146, 140, 138/177; 428/36; 264/563, 209.1

[56] References Cited

U.S. PATENT DOCUMENTS

| | | | |
|---|---|---|---|
| 3,271,477 | 9/1966 | Kresge | 428/379 |
| 3,411,981 | 11/1968 | Thomas | 138/141 |
| 3,561,493 | 2/1971 | Maillard | 138/141 |
| 3,718,161 | 2/1973 | Woodson | 138/153 |
| 3,741,253 | 6/1973 | Brax et al. | 138/137 |
| 3,904,111 | 9/1975 | Petersson | 236/93 R |
| 4,018,250 | 4/1977 | Waters | 138/140 |
| 4,097,569 | 6/1978 | Waters | 264/255 |
| 4,101,699 | 7/1978 | Stine et al. | 428/36 |
| 4,243,074 | 1/1981 | Strutzel et al. | 138/118.1 |
| 4,348,349 | 9/1982 | Kurtz | 264/564 |
| 4,364,981 | 12/1982 | Horner et al. | 138/137 X |
| 4,523,970 | 6/1985 | Toy | 156/244 |
| 4,705,829 | 11/1987 | Kwack et al. | 525/240 |

*Primary Examiner*—Werner H. Schroeder
*Attorney, Agent, or Firm*—Loyal M. Hanson; Frank J. Uxa; Gordon L. Peterson

[57] ABSTRACT

A tube having an elongated core composed of a flexible narrow molecular weight distribution first polymeric composition, a sheath composed of a broader molecular weight second polymeric composition co-extruded over the outer core surface, and a liner composed of a broader molecular weight distribution second polymeric composition co-extruded over the inner core surface. The core may be composed of a composition exhibiting relative poor processability, and the sheath and liner of a composition exhibiting better processability.

31 Claims, 1 Drawing Sheet

4,791,965

CO-EXTRUDED TUBE

BACKGROUND OF THE INVENTION

1. Technical Field

The invention described in this application relates generally to tubing, and more particularly to a multi-layer tube featuring beneficial extrusion and flow properties and a pleasing appearance.

2. Background Information

Tubing carrying a flow of fluid under pressure, such as irrigation tubing and the like, should exhibit properties of flexibility, strength, and durability. It should be lightweight and present minimal resistance to fluid flow, and it should employ inexpensive materials and fabrication techniques. In addition to these attributes, many users prefer tubing with a pleasing appearance.

A relatively narrow molecular weight distribution polymeric composition, such as a narrow molecular weight distribution ethylene copolymer, exhibits many of the desired attributes. However, such a composition is difficult to extrude, and this is important because extrusion is the preferred fabrication technique, enabling relatively convenient and inexpensive fabrication of the miles of tubing in demand. A narrow molecular weight distribution polymeric composition tends to stick to the extrusion die and become pitted. This results in increased resistance to fluid flowing within the finished tubing, as well as an unpleasant appearance. Thus, it is desirable to have a new and improved tubing structure that overcomes these concerns.

SUMMARY OF THE INVENTION

This invention recognizes the problems associated with the prior art and provides a new and improved tube with the desired attributes.

Briefly, the above and further objects of the present invention are realized in a tube structure comprising a core composed of a relatively narrow molecular weight distribution first polymeric composition having an inner liner and an outer sheath. At least one of the sheath and the liner is composed of a second polymeric composition having a molecular distribution that is broader than the molecular weight distribution of the first polymeric composition.

The tube is preferably produced by co-extruding the first and second polymeric compositions.

The tube structure, including one or more relatively broad molecular weight distribution second polymeric compositions, has improved extrusion properties, and presents less resistance to fluid flow and a more pleasing appearance relative to a tube structure composed of a single, narrow molecular weight distribution polymeric composition. This is achieved while maintaining many of the desired attributes of a tube structure of a relatively narrow molecular weight distribution polymeric composition.

Thus, the tube of this invention overcomes many drawbacks of existing tube structures by producing, preferably co-extruding, the desired tube configuration from a combination of selected materials.

The above mentioned and other objects and features of this invention and the manner of attaining them will become apparent, and the invention itself will be best understood, by reference to the following description taken in conjunction with the accompanying illustrative drawings.

DESCRIPTION OF THE PREFERRED EMBODIMENTS

Figure 1:
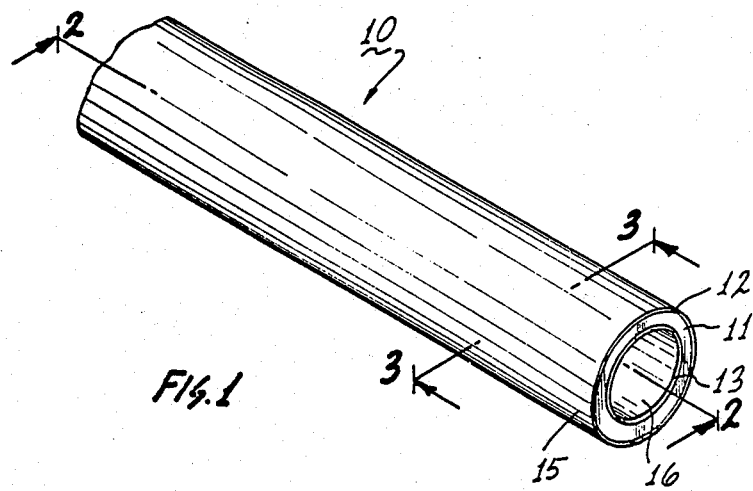
FIG. 1 of the drawings is a perspective view of a length of tubing constructed according to the invention.
Figure 2:
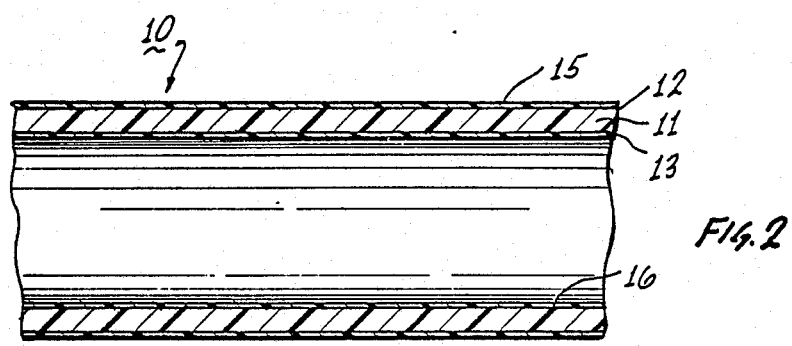
FIG. 2 is a cross sectional view of the tubing taken on line 2—2 of FIG. 1.
Figure 3:
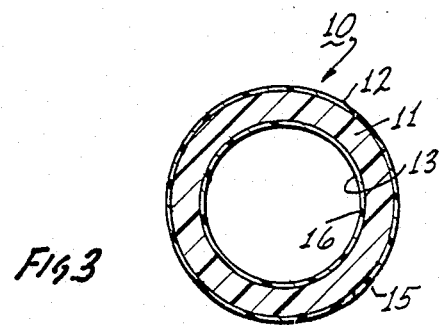
FIG. 3 is a cross sectional view taken on line 3—3 of FIG. 1.

Referring now to the drawings, there is shown a new and improved tube 10 constructed according to the invention. Although the illustrated tube 10 is a length of irrigation tubing, the inventive concepts are equally applicable to other tubing utilized for carrying a flow of liquid under pressure.

Generally, tube 10 includes an elongated, tubular core 11 having an outer core surface 12 and an inner core surface 13. Core 11 is composed of a narrow molecular weight distribution first polymeric composition, a type of linear, low density polyethylene, that exhibits desired characteristics of strength, durability, flexibility, light weight, and relative inexpense.

A sheath 15 is co-extruded over outer core surface 12 and a liner 16 is co-extruded over inner core surface 13. The sheath 15 and the liner 16 are composed of a relatively more broad molecular weight distribution second polymeric composition, another type of linear, low molecular weight polyethylene. The sheath 15 and the liner 16 allow the tube 10 to be more easily manufactured, e.g., extruded, to be less resistant to fluid flow, and to have a more pleasing, e.g., less pitted, appearance.

The core 11 preferably comprises at least about 90%, more preferably about 94%, e.g., about 99%, by volume of the total volume of the core 11, the sheath 15 and the liner 16. The thickness of each of the sheath 15 and the liner 16 is preferably in the range of about 0.0001 inch (2.5 microns) to about 0.01 inch (250 microns), more preferably about 0.0002 inch (5 microns) to about 0.0008 inch (20 microns).

The first and second polymeric compositions useful in the present tube structure, e.g., the tube 10, may be selected from any such compositions capable of functioning as described herein. One important characteristic of the present tube structure is that the core or center of the structure, e.g., the core 11, be made of a first polymeric compositions having a given molecular weight distribution and that the outer sheath, e.g., the sheath 15, and inner liner, e.g., the liner 16, be made of one or more second polymeric compositions having broader molecular weight distributions. The outer sheath and inner liner can be made of different compositions, although it is preferred to employ the same second polymeric composition for both of these components.

Materials useful as the first and second polymeric compositions in the present invention include polymeric mixtures thereof, such as homopolymers and copolymers of olefins containing two to about eight or more carbon atoms per molecule, and the like. Since the presently useful polymeric compositions can be produced using conventional and well known polymerization processes and techniques, a detailed discussion of such processes and techniques need not be presented here.

In one embodiment, the first polymeric composition preferably has a molecular weight distribution, i.e., defined as the ratio of the weight average molecular weight, $M_w$, of the composition to the number average molecular weight, $M_n$, of the composition, in the range of about two to about six, more preferably about two and one-half to about four and one-half.

The first polymeric composition may advantageously be selected from the group consisting of homopolymers of olefins containing two to about eight carbon atoms per molecule, copolymers of such olefins and mixtures thereof. Such copolymers are preferably derived from ethylene and at least one olefin containing three to about eight carbon atoms per molecule.

Particularly useful first polymeric compositions are selected from the group consisting of linear homopolymers of ethylene, linear copolymers of a major amount, i.e., greater than about 50 mol percent, and preferably greater than about 90 mol percent, of ethylene and a minor amount, i.e., less than about 50 mol percent, and preferably less than about 10 mol percent, of one or more $C_3$ to $C_8$ alpha olefins, and mixtures thereof.

The second polymeric compositions are chosen so as to have a broader molecular weight distribution than the first polymeric composition and to provide at least one desired property, e.g., outlined herein, to the present structure. In one particular embodiment, the second polymeric composition is selected from homopolymers of olefins containing two to about eight carbon atoms per molecule and mixtures thereof. Polyethylene and polypropylene, especially polyethylene, are preferred second polymeric compositions.

Thus, the tube structure has improved extrusion properties. It presents less resistance to fluid flow and a more pleasing appearance. This is achieved while maintaining many of the desired attributes of the core composition to overcome many drawbacks of existing tube structures by producing, preferably co-extruding, the desired tube configuration from a combination of selected materials.

From a different perspective, the invention provides a tube that includes a core composed of a composition exhibiting relatively poor processability disposed between a sheath layer and a liner layer, at least one of which is composed of a composition exhibiting better processability. In this regard, processability refers to the extrudability of the composition, i.e., the degree to which the composition can be extruded without undesirable consequences such as pitting. Thus, according to one aspect of the invention, a sheath layer and a liner layer are used advantageously to enable co-extrusion of a tube that exhibits many desirable attributes of the core. And, this may be done with sheath and liner layers as thin as approximately 0.00025 to 0.020 inch.

Although an exemplary embodiment of the invention has been shown and described, many changes, modifications, and substitutions may be made by one having ordinary skill in the art without necessarily departing from the spirit and scope of this invention.

What is claimed is:

1. A tube, comprising:
an elongated, tubular core composed of a first polymeric composition, the core having an outer core surface and an inner core surface; and
a sheath disposed over the outer core surface and a liner disposed over the inner core surface, at least one of which sheath and liner is composed of a second polymeric composition having broader molecular weight distribution than the first polymeric composition, provided that said core comprises at least about 94% of the total volume of said core, said sheath and said liner.

2. The tube of claim 1, wherein:
both the sheath and the liner are composed of the second polymeric composition.

3. The tube of claim 1 which is formed by co-extrusion of the first polymeric composition and second polymeric composition.

4. The tube of claim 1, wherein:
the first polymeric composition and second polymeric composition are selected from the group consisting of polyolefins and mixtures thereof.

5. The tube of claim 1, wherein:
said core comprises at least about 99% of the total volume of said core, said sheath and said liner.

6. The tube of claim 1, wherein:
the first polymeric composition is selected from the group consisting of homopolymers of olefins containing 2 to about 8 carbon atoms per molecule, copolymers of such olefins and mixtures thereof.

7. The tube of claim 6, wherein:
the copolymers are derived from ethylene and at least one olefin containing 3 to about 8 carbon atoms per molecule.

8. The tube of claim 1, wherein:
the second polymeric composition is selected from the group consisting of homopolymers of olefins containing 2 to about 8 carbon atoms per molecule, and mixtures thereof.

9. The tube of claim 1, wherein:
the sheath and the liner are comprised of different second polymeric compositions.

10. A tube, comprising:
an elongated, tubular core composed of a first polymeric composition, the core having an outer core surface and in inner core surface; and
a sheath disposed over the outer core surface and a liner disposed over the inner core surface, at least one of which sheath and liner is composed of a second polymeric composition which is linear and has a broader molecular weight distribution than the first polymeric composition, provided that said core comprises at least 94% of the total volume of said core, said sheath and said liner.

11. A tube, comprising:
an elongated, tubular core composed of a first polymeric composition, the core having an outer core surface and an inner core surface; and
a sheath disposed over the outer core surface and a liner disposed over the inner core surface, at least one of which sheath and liner consist essentially of a second polymeric composition which is linear and has a broader molecular weight distribution than the first polymeric composition.

12. The tube of claim 11, wherein:
both the sheath and the liner consist essentially of the second polymeric composition.

13. The tube of claim 11 which is formed by co-extrusion of the first polymeric composition and the second polymeric composition.

14. The tube of claim 11 wherein:
the first polymeric composition and the second polymeric composition are selected from the group consisting of polyolefins and mixtures thereof.

15. The tube of claim 11 wherein:
the molecular weight distribution of the first polymeric composition is in the range of about 2 to about 6.

16. The tube of claim 11 wherein:
the molecular weight distribution of the first polymeric composition is in the range of about 2.5 to about 4.5.

17. The tube of claim 11 wherein:
the first polymeric composition is selected from the group consisting of homopolymers of olefins containing 2 to about 8 carbon atoms per molecule, copolymers of such olefins and mixtures thereof.

18. The tube of claim 11 wherein:
the copolymers are derived from ethylene and at least one olefin containing 3 to about 8 carbon atoms per molecule.

19. The tube of claim 11 wherein:
the second polymeric composition is selected from the group consisting of homopolymers of olefins containing 2 to about 8 carbon atoms per molecule, copolymers of such olefins and mixtures thereof.

20. The tube of claim 11 wherein:
the sheath and the liner consist essentially of different second polymeric compositions.

21. A tube, comprising:
an elongated, tubular core composed of a first polymeric composition, the core having an outer core surface and an inner core surface; and
a sheath disposed over the outer core surface and a liner disposed over the inner core surface, at least one of which sheath and liner consists essentially of a second polymeric composition which is linear and has a broader molecular weight distribution than the first polymeric composition, provided that said core comprises at least about 99% of the total volume of said core, said sheath and said liner.

22. A method of decreasing tube flow resistance while improving tube appearance, comprising:
forming a tubular core composed of a first polymeric composition having a relatively narrow molecular weight distribution; and
forming a sheath and a linear over respective ones of an outer surface of the core and an inner surface of the core so that at least one of the sheath and the linear are composed of a polymeric composition having a broader molecular weight distribution than the first polymeric composition, provided that said core comprises at least about 94% of the total volume of said core, said sheath and said liner.

23. A method as recited in claim 22, further comprising:
co-extruding the core, the sheath, and the liner.

24. A method as recited in claim 23, wherein the step of co-extruding includes:
co-extruding the core, the sheath, and the liner so that the resulting tube is substantially fracture free.

25. A method of fabricating a tube, comprising:
forming a core having desired tubing characteristics from a first composition exhibiting relatively poor processability; and
forming a sheath over an outer surface of the core from a second composition and a liner over an inner surface of the core from a third composition, at least one of which second and third compositions exhibit better processability, provided that said core comprises at least about 94% of the total volume of said core, said sheath and said liner.

26. A method as recited in claim 25, wherein:
the first composition is a first polymeric composition having a relatively narrow molecular weight distribution; and
at least one of the second and third compositions is a second polymeric composition having a broader molecular weight distribution than the first polymeric composition.

27. A method of decreasing tube flow resistance while improving tube appearance, comprising:
forming a tubular core composed of a first polymeric composition having a relatively narrow molecular weight distribution; and
forming a sheath and a liner over respective over of an outer surface of the core and an inner surface of the core so that at least one of the sheath and the liner consists essentially or a second polymeric composition which is linear and has broader molecular weight distribution than the first polymeric composition, provided that said core comprises at least about 99% of the total volume of said core, said sheath and said liner.

28. A method as recited in claim 27, further comprising: co-extruding the core, the sheath, and the liner.

29. A method as recited in claim 28, wherein the step of co-extruding includes:
co-extruding the core, the sheath, and the liner so that the resulting tube is substantially fracture free.

30. A method of fabricating a tube, comprising:
forming a core having desired tubing characteristics from a first polymeric composition exhibiting relatively poor processability; and
forming a sheath over an outer surface of the core consisting essentially of a second polymeric composition and a liner over an inner surface of the core consisting essentially of a third polymeric composition, at least one of which second and third polymeric compositions is linear and exhibits better processability.

31. A method as recited in claim 30, wherein:
the first polymeric composition has a relatively narrow molecular weight distribution; and
at least one of the second and third polymeric compositions has a broader molecular weight distribution than the first polymer composition.

* * * * *